US005856668A

United States Patent [19]

Nelle et al.

[11] Patent Number: 5,856,668
[45] Date of Patent: Jan. 5, 1999

[54] PHOTOELECTRIC POSITION MEASURING ENCODER HAVING SCALE FORMED OF ELECTRICALLY NON-CONDUCTIVE MATERIAL

[75] Inventors: Günther Nelle, Bergen; Peter Fernsebner, Siegsdorf, both of Germany

[73] Assignee: Johannes Heidenhain GmbH, Traunreut, Germany

[21] Appl. No.: 839,002

[22] Filed: Apr. 23, 1997

[30] Foreign Application Priority Data

Apr. 26, 1996 [DE] Germany ............... 196 16 707.8

[51] Int. Cl.$^6$ ............................................. H01J 3/14
[52] U.S. Cl. ............... 250/231.13; 250/231.14; 250/237 G; 341/13
[58] Field of Search ............... 250/231.13, 231.14, 250/237 G; 341/13, 31; 356/375

[56] References Cited

U.S. PATENT DOCUMENTS

| 4,786,891 | 11/1988 | Ueda et al. ............... 341/13 |
| 4,906,838 | 3/1990 | Sogabe et al. ............... 250/231.14 |
| 5,030,825 | 7/1991 | Ikeuchi ............... 250/231.14 |
| 5,670,781 | 9/1997 | Setbacken ............... 250/237 G |

Primary Examiner—Stephone B. Allen
Attorney, Agent, or Firm—Anderson, Kill & Olick, P.C.

[57] ABSTRACT

A photoelectric position measuring encoder including a scale formed of an electrically non-conductive material and having a graduation, a scanner for photoelectrically scanning the graduation and displaceable relative to the scale in a measuring direction for generating a position-dependent signal, a slide or roller element for supporting the scanner on a scale surface, and an electrically conductive element with which the scanner-supporting scale surface region forms an electrical contact and which is connected to a reference potential.

10 Claims, 2 Drawing Sheets

PHOTOELECTRIC POSITION MEASURING ENCODER HAVING SCALE FORMED OF ELECTRICALLY NON-CONDUCTIVE MATERIAL

BACKGROUND OF THE INVENTION

1. Field of the Invention

The present invention relates to a photoelectric position measuring encoder including a scale formed of an electrically non-conductive material and having a graduation, a support member to which the scale is secured, a scanner for photoelectrically scanning the graduation and displaceable relative to the scale in a measuring direction for generating a position-dependent signal, and a slide or roller element for supporting the scanner on the scale surface.

2. Description of the Prior Art

Encoders described above are used for determining an incremental or absolute position in both machine-tools and in coordinate measuring machines.

In photoelectric position measuring encoders, the scale is scanned, without being contacted, by using a light source and photosensors. The signals generated by such scale scanning are relatively small and, therefore, susceptible to distortions.

German Patent No. 2,505,587 describes a photoelectric linear encoder to the improvement of which the present invention is directed. In the encoder of German Patent No. 2,505,587, a glass scale is secured to the housing with a highly elastic adhesive layer. A slide block supports the scanner on the glass scale, with the scale forming a guide for the scanner.

A drawback of this encoder consists in that the outer scale surface accumulates an electrical charge, which can become so large that a discrete electrical discharge via the scanner takes place. This discrete discharge generates an electrical pulse which acts as a distortion pulse. This distortion pulse is interpreted by the evaluation system in particular in incremental measuring systems, as a pulse which has to be counted or as a reference mark pulse.

U.S. Pat. No. 5,030,825 discloses an angular encoder in which a plurality of photosensors are used for scanning the scale. A scanning plate is provided between the scale and the photosensors. This scanning plate is formed of an electrically conductive material and is connected to a reference potential (to the ground). In this way, the scanning plate screens the photosensors from distortion electromagnetic fields.

The drawback of using such a scanning plate consists in that this plate cannot be formed of a transparent material on which very fine structured marks, on which are subjected to scanning, can be put. Moreover, distortion signals, which are outputted by the scale, cannot be eliminated by this scanning plate.

Accordingly, an object of the present invention is a photoelectric position measuring encoder with an improved distortion protection.

SUMMARY OF THE INVENTION

This and other objects of the present invention, which will become apparent hereinafter, are achieved by providing electrically conductive means with which the outer, scanner-supporting surface of the scale forms an electrical contact, and an electrically conductive connection element for connecting the electrically conductive means with a reference potential.

The advantage of providing the electrically conductive means which is contacted by the scale and is connected with the reference potential consists in that this means prevents the position-defendant scanning signals from being influenced by static discharges of the scale.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
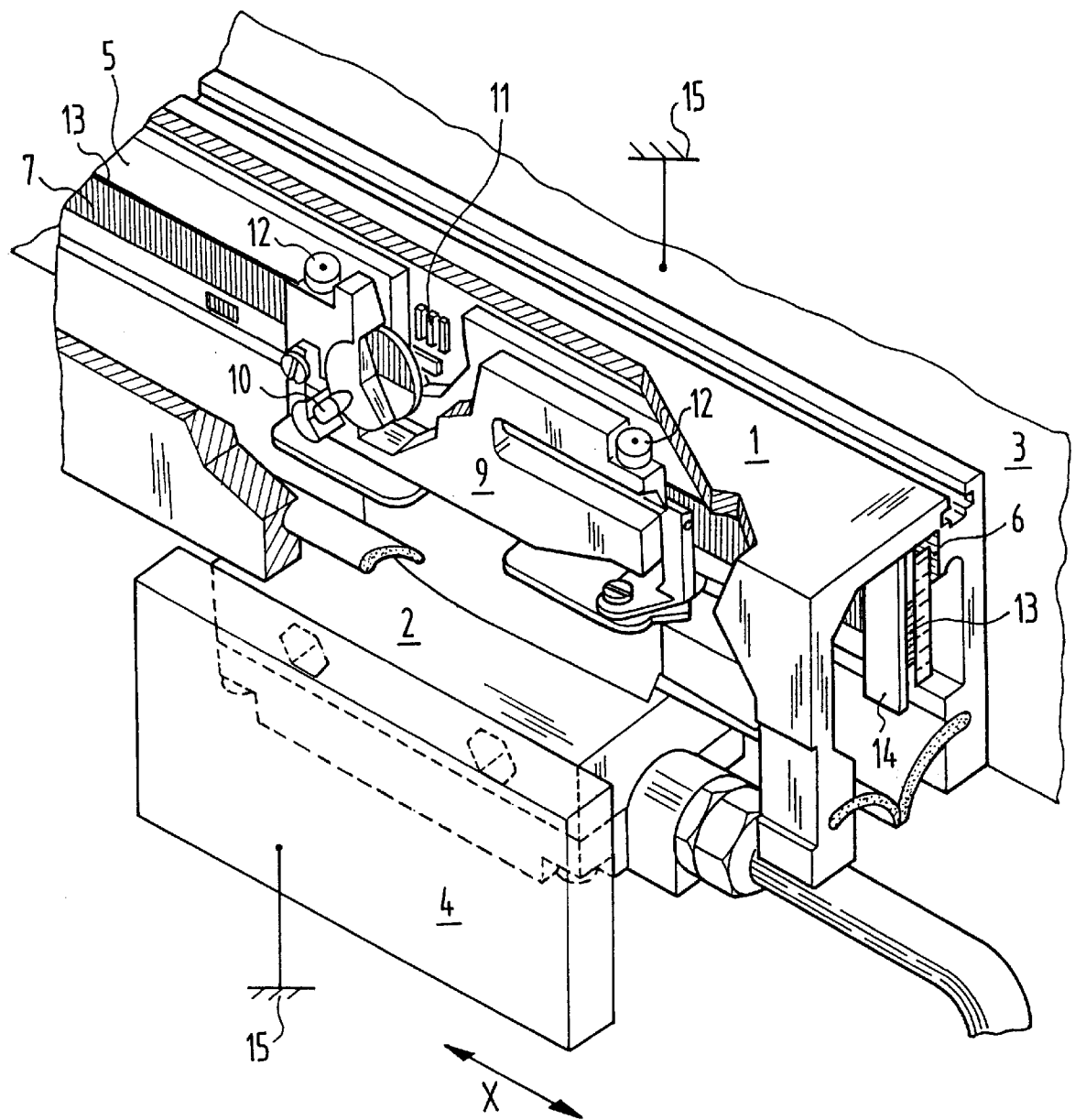
FIG. 1 is a partially broken perspective view of a photoelectrical incremental linear encoder with a scale according to a first embodiment.

A photoelectrical incremental linear encoder, according to the present invention, which is shown in FIG. 1, consists of two, displaceable in a measuring direction relative to each other, main components, namely, a housing 1 and a carrier 2. The housing 1 and the carrier 2 are secured, respectively, on first and second machine parts 3 and 4. The housing 1 is formed of metal, usually of aluminum, and therefore, is electrically conductive. Inside the housing 1, a glass scale 5 is secured. The scale 5 is secured to a surface of the housing 1 with an elastic adhesive layer 6. The layer 6 is electrically insulated. The elastic adhesive layer insures a free expansion of the scale 5 independent by the housing 1 with a change in temperature. No constraining force is transmitted to the scale. An incremental graduation 7 of light-transmitting chromium marking 8 is provided on the transparent scale 5. The incremental graduation 7 is scanned by a scanner 9 which is secured on the carrier 2. The scanner 9 includes a light source 10 and a plurality of photosensors 11. The light from the light source 10 passes through transparent regions of the graduation 7 and falls on the photo-sensors 11. Thereby, periodically, analog electrical scanning signals are generated which, in per se known manner, are transmitted to an evaluation device for forming discrete square wave signals. The scanner 9 is resiliently supported by a ball bearing element 12 on the surface of the scale 5 carrying the graduation 7. An outer electrical field as well as the rolling and sliding of the ball bearing element 12 can cause an electrical charging of this surface of the scale 5, which results in a difference of potentials of this surface and other electrically conductive parts of the linear encoder. The difference of potentials can cause a pulse-like electrical discharge. These electrical discharges superimpose on the electrical scanning signals which, in incremental measuring systems, results in that discrete pulses and, thereby, count errors or, otherwise, incorrect signals are transmitted to the evaluation device.

In order to eliminate the electrical charging of the graduation-carrying surface of the scale 5 along its entire length, there is provided, according to the first embodiment, on the graduation carrying surface of the scale 5 along the entire measuring length, a chromium layer 13 which electrically connects marks 8 of the incremental graduation 7 with each other. The electrically conductive layer 13 is electrically connected with the housing 1 at one end of the scale 5. To this end, there is provided a metal sheet member 14 which is secured to the scale 5 by clamping. The metal sheet member 14 can be clamped between the layer 13 of the scale 5 and the housing 1. Alternatively, the metal sheet member 14 can be secured to both the scale 5 and the housing 1 with electrically conductive adhesive material. The sheet metal member 14 electrically connects the layer 13 with a reference potential 15 because the electrically conductive housing 1 is secured on the machine part 3 with a possibility of an electrical conductivity therebetween, and the machine part is connected with the reference potential (earth, mass). To provide a good electrically conductive connection between the scale 5 and the aluminum housing 1, it is necessary that the metal sheet member 4 contact the housing 1 in a non-anodized region.

To prevent the electrical charging of the ball bearing element 12, the bearing element 12 is likewise connected with the reference potential via the electrically conductive carrier 2 and the second machine part 4. The ball bearing element 12 rolls outside of the layer 13 to prevent damage of the layer 13 by abrasion.

Figure 2:
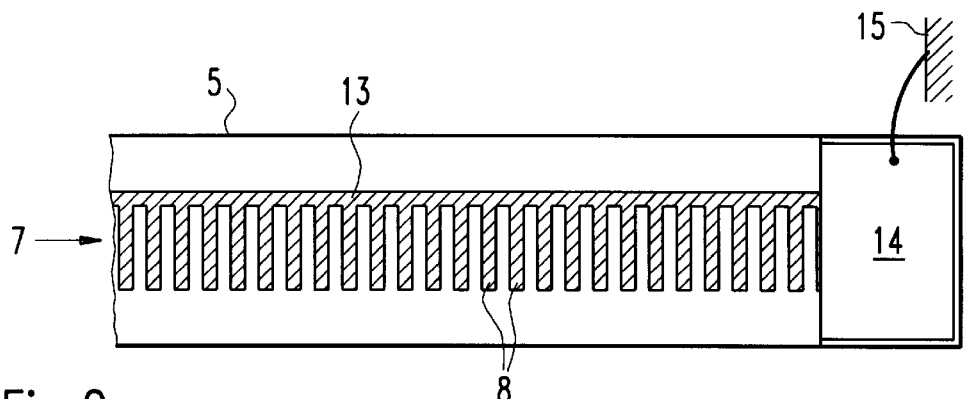
FIG. 2 is a plan view of the scale according to the first embodiment.

FIG. 2 shows a plan view of the scale 5 of the linear encoder shown in FIG. 1. Both the marks 8 and the layer 13 are provided on the graduation-supporting scale surface by one common coating process. In this as well as in the below described embodiments, the marks 8 are scanned by light transmission. When the marks 8 are made reflective, scanning by light reflection is possible. Further, the connecting layer 13 can be formed as a rolled or otherwise made strip which abuts the graduation-carrying surface of the scale 5. If this strip-formed layer 13 is sufficiently hard, the ball bearing element can roll over it. In the drawing, the electrical connection between the metal sheet member 14 and the reference potential 15 is shown only schematically.

In all of the FIGS. 1–5, the same elements are designated with the same reference numerals.

Figure 3:
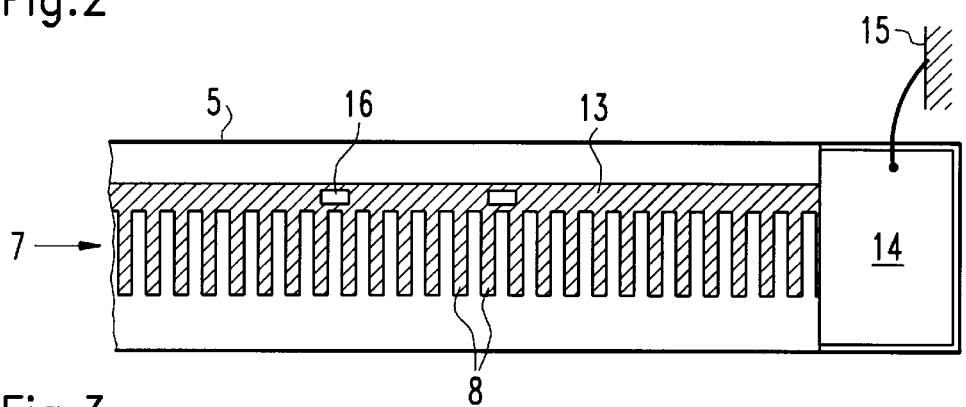
FIG. 3 is a plan view of a scale according to a second embodiment.

According to the embodiment of FIG. 3, the layer 13 is provided over the entire measuring length, and the reference marks 16 are formed as transparent windows in the layer 13. The marks 8, the reference marks 16, and the electrically conductive layer 13 are provided by a single lithographic and coating process.

Figure 4:
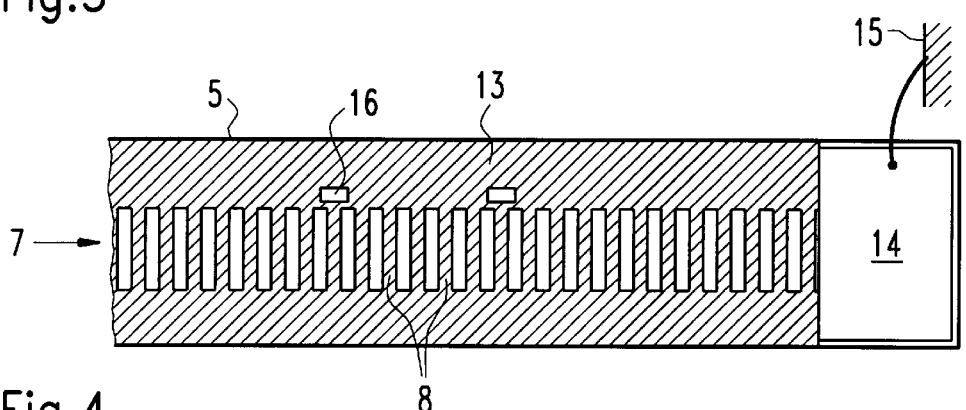
FIG. 4 is a plan view of a scale according to a third embodiment.

According to the embodiment of FIG. 4, the layer 13 is provided over the entire surface of the scale 5 and therefore conducts the electrical charges to the sheet metal member 14 and, thus, to the reference potential 15 particularly good.

Figure 5:
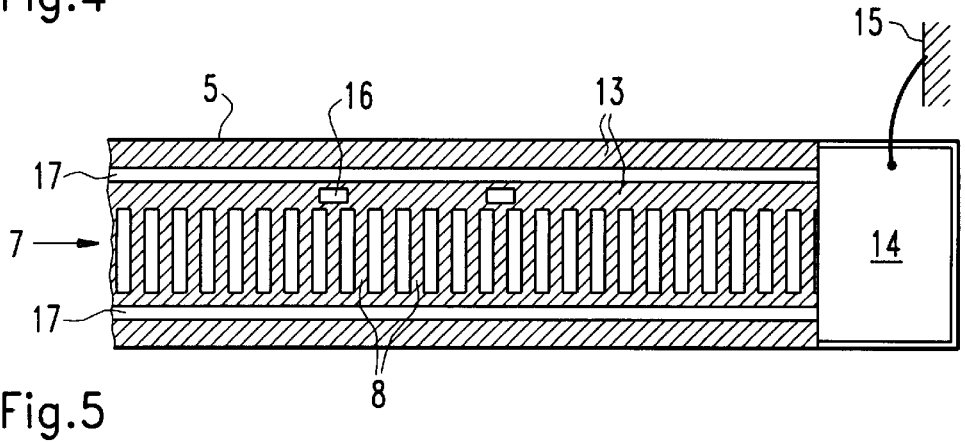
FIG. 5 is a plan view of a scale according to a fourth embodiment.

In the embodiment of FIG. 5, there are provided two material-free tracks 17 in the layer 13 along which the ball bearings 12 can roll. In order to carry the electrical charge from the tracks 17 away, the tracks 17 are formed as small as necessary.

In a manner not shown in the drawings, instead of the metal layer 13, an electrically conductive transparent layer can be provided on the scale 5. The advantage of providing a transparent layer consists in that it does not optically disturb the marks 8 and, therefore, can cover the entire surface under or above the marks 8 and be formed by vapor deposition.

It is particularly advantageous when an electrical connection is formed between the layer 13 of the scale 5 and the reference potential of a stationary relative thereto part 1. Such a connection can be stable and can insure a good electrical conductivity, and is, therefore, very reliable. This electrical connection, however, can be also provided between the scale 5 and the scanner 9 or the carrier 2. In this case, a spring sliding contact is secured on the carrier 2, which contact has one end thereof connected to the reference potential 15, with the other end being in electrical contact with the respective surface of the scale 5. In particular, this contact would slide along the layer 13.

Instead of the metal sheet member 14, other electrically conductive connection elements can be used.

The application of the present invention is not limited to the incremental system but can also be used in absolute position measuring systems.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A photoelectric position measuring encoder, comprising:

a scale formed of an electrically non-conductive material and having a graduation;

a support member to which the scale is secured;

a scanner for photoelectrically scanning the graduation and displaceable relative to the scale in a measuring direction for generating a position-dependent signal;

one of a slide and roller element for supporting the scanner on a scale surface region;

electrically conductive means with which the scanner-supporting scale surface region forms an electrical contact; and an electrically conductive connection element for connecting the electrically conductive means with a reference potential.

2. A photoelectric position measuring encoder as set forth in claim 1, wherein the scale is formed of one of glass and glass-ceramics, and the encoder further comprises an electrically insulated layer for securing the scale to the support member.

3. A photoelectric position measuring encoder as set forth in claim 1, wherein the electrically conductive means comprises an electrically conductive continuous layer provided on the scanner-supporting scale surface region along an entire measuring region of the scale.

4. A photoelectric position measuring encoder as set forth in claim 1, wherein the photoelectricity scanned graduation is formed of marks representing a sequence of electrically conductive regions of a layer, which are spaced from each other and are arranged one after another in the measuring direction, the electrically conductive regions being electrically connected with each other and the reference potential.

5. A photoelectric position measuring encoder as set forth in claim 3, wherein the electrically conductive layer comprises one of a transparent layer and a metal layer.

6. A photoelectric position measuring encoder as set forth in claim 2, wherein the electrically insulated layer comprises an elastic adhesive layer.

7. A photoelectric position measuring encoder as set forth in claim 1, wherein the electrically conductive connection element is arranged between the scale and the support member which is formed as an electrically conductive body and is connected with the reference potential.

8. A photoelectric position measuring encoder as set forth in claim 7, wherein the support member is formed as a scale housing.

9. A photoelectric position measuring encoder as set forth in claim 7, wherein the electrically conductive connection element comprises a sheet material member having surfaces thereof electrically conductively secured to an electrically conductive surface of the scale and the support member, respectively.

10. A photoelectric position measuring encoder as set forth in claim 7, wherein the electrically conductive connection element comprises an electrically conductive adhesive.

\* \* \* \* \*